(12) United States Patent
Ouchi

(10) Patent No.: US 9,051,002 B2
(45) Date of Patent: Jun. 9, 2015

(54) ELECTRICAL POWER STEERING APPARATUS

(75) Inventor: Mitsuyuki Ouchi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/359,432

(22) PCT Filed: Dec. 26, 2011

(86) PCT No.: PCT/JP2011/080029
§ 371 (c)(1),
(2), (4) Date: May 20, 2014

(87) PCT Pub. No.: WO2013/098909
PCT Pub. Date: Jul. 4, 2013

(65) Prior Publication Data
US 2014/0302954 A1    Oct. 9, 2014

(51) Int. Cl.
*B62D 5/04* (2006.01)
*F16H 7/08* (2006.01)
*F16H 7/14* (2006.01)

(52) U.S. Cl.
CPC .............. *B62D 5/0412* (2013.01); *B62D 5/04* (2013.01); *B62D 5/0424* (2013.01); *F16H 7/08* (2013.01); *F16H 7/14* (2013.01)

(58) Field of Classification Search
CPC ...... B05D 5/04; B05D 5/0403; B05D 5/0421; B05D 5/0445; F16H 7/08; F16H 2007/0842; F16H 2007/0851; F16H 2007/0853
USPC .......... 180/443, 444, 446; 474/101, 109, 118, 474/121, 133, 136
See application file for complete search history.

(56) References Cited

U.S. PATENT DOCUMENTS 6,938,722 B2 *  9/2005  Sasaki et al. .................. 180/444
7,637,348 B2 * 12/2009  Namgung ..................... 180/444
(Continued)

FOREIGN PATENT DOCUMENTS

DE         1 450 801        9/1969
DE   10 2007 004 521 A1    7/2008
(Continued)

OTHER PUBLICATIONS

International Search Report Issued Apr. 3, 2012 in PCT/JP11/080029 filed Dec. 26, 2011.

*Primary Examiner* — Joseph Rocca
*Assistant Examiner* — Marc A Scharich
(74) *Attorney, Agent, or Firm* — Oblon, McClelland, Maier & Neustadt, L.L.P.

(57) ABSTRACT

An electrical power steering system is configured to assist steering by transmitting, through a belt, a rotational force of a driving pulley coaxially coupled to a rotational shaft of an electrical motor to a driven pulley coaxially coupled to a rotational member of a steering apparatus. The electrical power steering system includes a belt tension adjustment mechanism for adjusting a tension of the belt. The belt tension adjustment mechanism includes: a guide surface and an engagement surface, which are formed as mating surfaces of a housing of the steering apparatus and a casing of the electrical motor so as to engage with each other; and a connector capable of relatively moving the engagement surface along the guide surface due to a connection force for connecting the housing and the casing under a state in which the guide surface and the engagement surface engage with each other. The guide surface is inclined by a predetermined amount with respect to an axial line direction of the rotational shaft.

2 Claims, 4 Drawing Sheets

(56) References Cited

U.S. PATENT DOCUMENTS

| | | |
|---|---|---|
| 7,823,687 B2 * | 11/2010 | Spengler et al. ............ 180/444 |
| 7,823,688 B2 * | 11/2010 | Spengler et al. ............ 180/444 |
| 2003/0221896 A1 | 12/2003 | Sasaki et al. |
| 2005/0079939 A1 * | 4/2005 | Simmons ..................... 474/113 |
| 2005/0121251 A1 * | 6/2005 | Ueno et al. .................. 180/444 |
| 2005/0133297 A1 * | 6/2005 | Chikaraishi ................. 180/444 |
| 2005/0247514 A1 * | 11/2005 | Heitzer ........................ 180/444 |
| 2007/0129192 A1 * | 6/2007 | Song et al. .................... 474/148 |
| 2008/0035415 A1 | 2/2008 | Namgung |
| 2008/0217098 A1 * | 9/2008 | Takeuchi et al. ............. 180/446 |

FOREIGN PATENT DOCUMENTS

| | | |
|---|---|---|
| JP | 2003 220959 | 8/2003 |
| JP | 2005 324708 | 11/2005 |
| JP | 2008 44604 | 2/2008 |
| JP | 2008 202679 | 9/2008 |

\* cited by examiner

ELECTRICAL POWER STEERING APPARATUS

TECHNICAL FIELD

The present invention relates to an electrical power steering system, and more particularly, to an electrical power steering system configured to assist steering by transmitting, through a belt, a rotational force of a driving pulley coaxially coupled to a rotational shaft of an electrical motor to a driven pulley coaxially coupled to a rotational member of a steering apparatus.

BACKGROUND ART

The electrical power steering system of this type is disclosed in, for example, Patent Literature 1. In the electrical power steering system disclosed in Patent Literature 1, a casing of the electrical motor (motor housing) is rotatably assembled onto a housing of the steering apparatus (gear housing), and a rotational center of the casing (motor housing) is separated from a rotational center of the driving pulley by a predetermined amount. Therefore, through rotation of the casing (motor housing) relative to the housing (gear housing), a separation distance between the driving pulley and the driven pulley can be adjusted, and thus a tension of the belt can be adjusted.

CITATION LIST

Patent Literature

[PTL 1] JP 2008-44604 A

SUMMARY OF INVENTION

By the way, in the electrical power steering system disclosed in Patent Literature 1, during the work of adjusting the tension of the belt, the tension of the belt needs to be measured for confirmation under a state in which the relative rotation of the housing (gear housing) and the casing (motor housing) is restricted. Therefore, a jig for restricting the relative rotation of the housing (gear housing) and the casing (motor housing) is necessary, resulting in degradation of workability.

The present invention has been made to solve the above-mentioned problem, and one embodiment of the present invention has the following feature.

Specifically, there is provided an electrical power steering system, which is configured to assist steering by transmitting, through a belt, a rotational force of a driving pulley, the driving pulley being coaxially coupled to a rotational shaft of an electrical motor, to a driven pulley, the driven pulley being coaxially coupled to a rotational member of a steering apparatus, the electrical power steering system including a belt tension adjustment mechanism for adjusting a tension of the belt, the belt tension adjustment mechanism including:

a guide surface and an engagement surface, which are formed as mating surfaces of a casing of the electrical motor and a housing of the steering apparatus so as to engage with each other; and a connector (for example, stays respectively provided to the casing and the housing, and a bolt and a nut that connect the stays to each other) capable of relatively moving the engagement surface along the guide surface due to a connection force for connecting the housing and the casing under a state in which the guide surface and the engagement surface engage with each other, the guide surface being inclined by a predetermined amount with respect to an axial line direction of the rotational shaft.

In the electrical power steering system according to one embodiment of the present invention, the belt tension adjustment mechanism includes the above-mentioned guide surface and engagement surface, and also includes the above-mentioned connector. The guide surface is inclined by the predetermined amount with respect to the axial line direction of the rotational shaft. Therefore, in the electrical power steering system, the casing is moved relative to the housing in the axial line direction of the rotational shaft of the electrical motor through use of the connector. Thus, the engagement surface can relatively be moved along the guide surface, and the casing can also be moved relative to the housing in a direction orthogonal to the axial line direction of the rotational shaft of the electrical motor.

Thus, the separation distance between the driving pulley and the driven pulley can be adjusted, and the tension of the belt can therefore be adjusted without the need to use a jig for restricting the relative movement of the casing and the housing. Further, in the electrical power steering system, the tension of the belt after the adjustment can be calculated for confirmation based on the connection force for the casing and the housing, which is generated by the connector (for example, a fastening force for the bolt and the nut, that is, an axial force of the bolt, which is calculated based on torque for fastening the bolt into the nut), and on the inclination angle of the guide surface. Therefore, there is no need to measure the tension of the belt after the adjustment separately from the connection work using the connector, and hence the work of adjusting the tension of the belt can be simplified.

When carrying out the present invention as described above, each of the guide surface and the engagement surface may be an inclined surface. In this case, the engagement between the guide surface and the engagement surface can be stabilized, and the work of adjusting the tension of the belt can therefore be facilitated. In this case, it is desired that the connector include: a bolt assembled onto one of the casing and the housing and arranged in parallel to an axial line of the rotational shaft; and a nut assembled onto another of the casing and the housing and threadedly fixed onto the bolt, and that an axial line of the bolt be arranged in a region in which the guide surface is present in an inclination direction of the guide surface. In this case, the operation (sliding operation) between the guide surface and the engagement surface when fastening the bolt into the nut can be stabilized, and the workability thereof can therefore be enhanced.

Further, when carrying out the present invention as described above, the electrical power steering system may further include a ratchet mechanism provided between the guide surface and the engagement surface, for allowing an operation in only a direction of increasing the tension of the belt. In this case, the casing is moved relative to the housing in the direction of increasing the tension of the belt, and thus the tension of the belt can be adjusted in an increasing manner. Besides, under the state in which the tension of the belt is adjusted in an increasing manner, the reverse operation (operation in a direction of decreasing the tension of the belt) is restricted by the ratchet mechanism. In this case, a tooth pitch of a ratchet of the ratchet mechanism may be set smaller than an adjustment range, which falls within a range of a target tension of the belt in a case of an upper limit of an individual difference of the belt (in a case of the belt that exhibits a highest value with respect to the tension of the belt). In this case, also in the case of the upper limit of the individual difference of the belt, through adjustment by an amount corresponding to one tooth of the ratchet, which is to be carried out lastly during the work of adjusting the tension of the belt, a pawl of the ratchet mechanism engages with the tooth of the ratchet within the adjustment range, which falls within the range of the target tension of the belt, and as a result, the reverse movement (operation in the direction of decreasing the tension of the belt) is restricted. Thus, through the above-mentioned adjustment by an amount corresponding to one tooth, the amount of movement of the casing is not adjusted beyond the adjustment range (the tension of the belt is not excessively adjusted in an increasing manner), and as a result, the tension of the belt can be adjusted appropriately.

DESCRIPTION OF EMBODIMENTS

Figure 1:
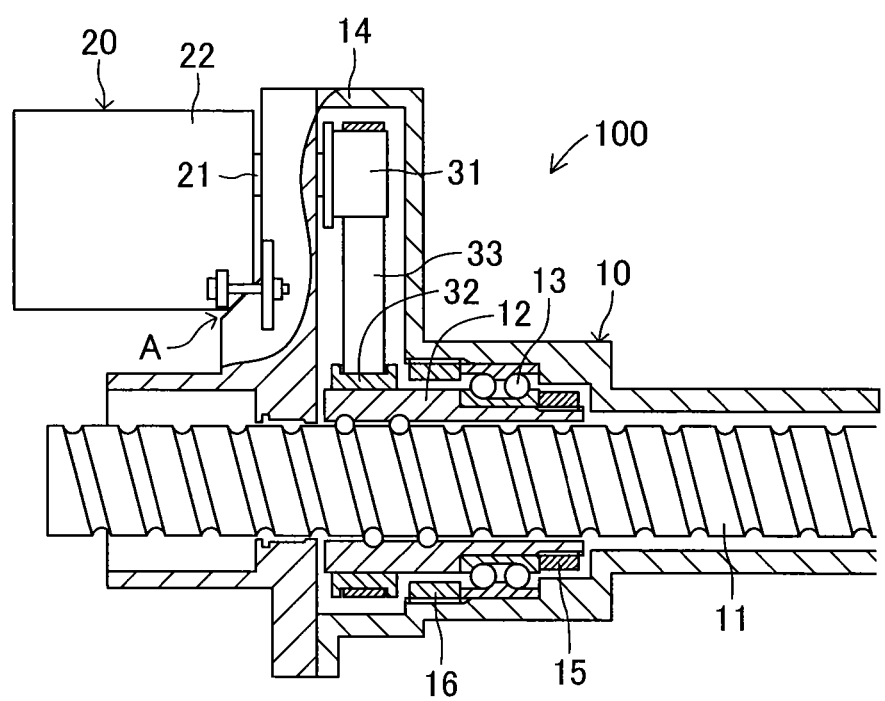
FIG. 1 is a partially cutaway front view schematically illustrating an electrical power steering system according to one embodiment of the present invention.
Figure 2:
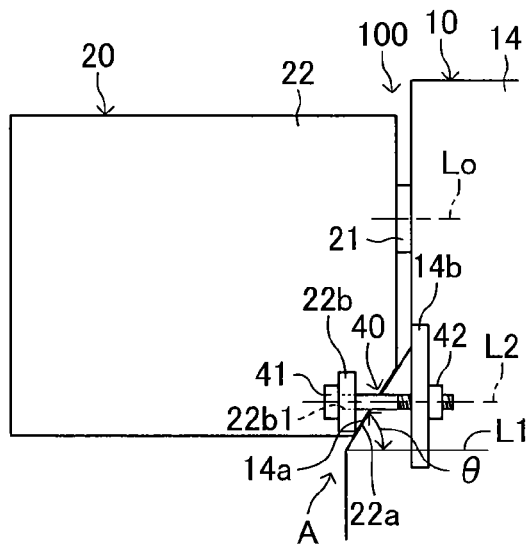
FIG. 2 is an enlarged front view illustrating a main part of FIG. 1.
Figure 3:
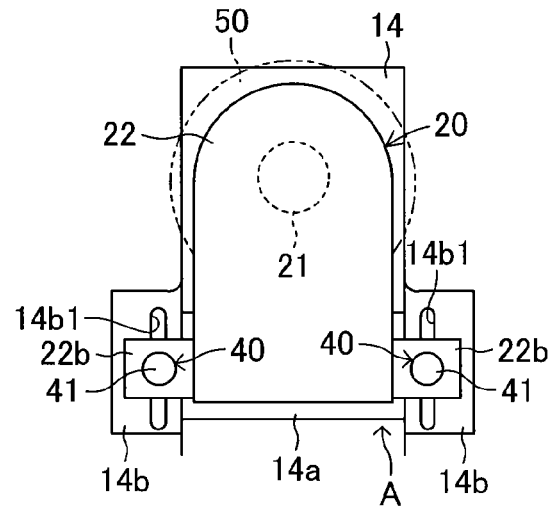
FIG. 3 is a side view of FIG. 2.

Now, embodiments of the present invention are described with reference to the drawings. FIGS. 1 to 3 schematically illustrate an electrical power steering system according to one embodiment of the present invention. In an electrical power steering system 100 of this embodiment, a rotational shaft 21 of an electrical motor 20 is arranged in parallel to a rack shaft 11 (ball screw shaft) arranged in a vehicle width direction. The electrical power steering system 100 includes a rack steering apparatus 10 and the electrical motor 20, and is configured to assist steering by transmitting, through a toothed belt 33, a rotational force of a driving pulley 31 (rotational force of the electrical motor 20), which is coaxially coupled to the rotational shaft 21 of the electrical motor 20 so as to allow torque transmission, to a driven pulley 32, which is coaxially coupled to a ball nut 12 serving as a rotational member of the steering apparatus 10 so as to allow torque transmission.

The rack steering apparatus 10 itself is a publicly-known steering apparatus. The rack shaft 11 connected to a steering wheel (not shown) through an intermediation of a pinion shaft (not shown), a steering shaft (not shown), and the like is supported by a housing 14 so as to be movable in the vehicle width direction. Further, in the steering apparatus 10, the ball nut 12 is assembled, in a freely rotatable manner, onto the housing 14 of the steering apparatus 10 through an intermediation of a bearing 13. Still further, the ball nut 12 and the bearing 13 are positioned and fixed with a fixing nut 15 assembled onto the ball nut 12 and a fixing nut 16 assembled onto the housing 14.

The electrical motor 20 is configured to be driven in response to steering torque to be transmitted from the steering wheel to the steering shaft. Therefore, the rotation of the rotational shaft 21 is transmitted to the ball nut 12 through the driving pulley 31, the belt 33, and the driven pulley 32, and is converted into an axial driving force for the rack shaft 11 (assisting force), to thereby assist the steering. Note that, the rotational shaft 21 is assembled onto a casing 22 of the electrical motor 20 in a freely rotatable manner.

By the way, in this embodiment, as illustrated in the enlarged views of FIGS. 2 and 3, a belt tension adjustment mechanism A for adjusting a tension of the belt 33 is provided between the housing 14 of the steering apparatus 10 and the casing 22 of the electrical motor 20. The belt tension adjustment mechanism A includes a guide surface 14a and an engagement surface 22a, which are formed as mating surfaces of the housing 14 of the steering apparatus 10 and the casing 22 of the electrical motor 20 so as to engage with each other in a slidable manner, and a pair of front and rear (pair of right and left in FIG. 3) connectors 40 capable of relatively moving the engagement surface 22a along the guide surface 14a due to a connection force for connecting the housing 14 and the casing 22 under a state in which the guide surface 14a and the engagement surface 22a engage with each other.

The guide surface 14a is formed in the housing 14 of the steering apparatus 10, and is inclined by a predetermined amount θ upward with respect to a line L1 (axial line direction) parallel to an axial line Lo of the rotational shaft 21 of the electrical motor 20. The engagement surface 22a is formed in the casing 22 of the electrical motor 20, and is inclined by the predetermined amount θ upward with respect to the line L1 similarly to the guide surface 14a.

Each connector 40 includes a bolt 41 assembled onto the casing 22 of the electrical motor 20, and a nut 42 assembled onto the housing 14 of the steering apparatus 10 and threadedly fixed onto the bolt 41. The bolt 41 is assembled onto each motor-side stay 22b, which is integrally provided to the casing 22 of the electrical motor 20, while being inserted in a direction toward a housing-side stay 14b, and is arranged in parallel to the axial line Lo of the rotational shaft 21 of the electrical motor 20. An axial line L2 of the bolt 41 is arranged at a middle portion in an up-and-down direction (inclination direction) of the guide surface 14a. A mounting circular hole 22b1 is formed in the motor-side stay 22b so that a shank portion of the bolt 41 is rotatably fitted into the mounting circular hole 22b1.

The nut 42 is assembled onto each housing-side stay 14b, which is integrally provided to the housing 14 of the steering apparatus 10, at a position opposite to the motor-side stay 22b, and is threadedly fixed onto a threaded portion of the bolt 41. An elongate hole 14b1 is formed in the housing-side stay 14b so that the shank portion (threaded portion) of the bolt 41 is inserted through the elongate hole 14b1 so as to be movable in the up-and-down direction, and that a protrusion (not shown) provided to the nut 42 is fitted into the elongate hole 14b1 so as to be movable in the up-and-down direction. Therefore, the nut 42 is held so as to be movable in the up-and-down direction under a state in which the rotation of the nut 42 is restricted by the elongate hole 14b1.

In the electrical power steering system 100 according to the embodiment configured as described above, the belt tension adjustment mechanism A includes the above-mentioned guide surface 14a and engagement surface 22a, and also includes the above-mentioned connectors 40. The guide surface 14a is inclined by the predetermined amount θ with respect to the direction of the axial line Lo (L1) of the rotational shaft 21. Therefore, in the electrical power steering system 100, the casing 22 is moved relative to the housing 14 in the direction of the axial line Lo of the rotational shaft 21 of the electrical motor 20 through use of the connectors 40. Thus, the engagement surface 22a can relatively be moved along the guide surface 14a, and the casing 22 can also be moved relative to the housing 14 in a direction (up-and-down direction) orthogonal to the direction of the axial line Lo of the rotational shaft 21 of the electrical motor 20.

Thus, a separation distance between the driving pulley 31 and the driven pulley 32 can be adjusted, and the tension of the belt 33 can therefore be adjusted without the need to use a jig for restricting the relative movement of the casing 22 and the housing 14. Note that, when an upper end portion of the electrical motor 20 is unstable in the above-mentioned structure, there may be arranged a spacer 50 (see the imaginary line of FIG. 3) having a non-circular shape (having a cutout lower portion) and a variable thickness (thickness corresponding to a gap between the housing 14 and the casing 22 after the adjustment of the tension of the belt), which is to be fitted and fixed between the housing 14 and the casing 22 after the adjustment of the tension of the belt, and a fixing connector (including a bolt and a nut (not shown)) for fixing upper portions of the housing 14 and the casing 22 after the adjustment of the tension of the belt.

Further, in the electrical power steering system 100, a tension F1 of the belt after the adjustment can be calculated for confirmation based on the connection force for the casing 22 and the housing 14, which is generated by the connectors 40 (specifically, a fastening force for fastening the pair of the bolt 41 and the nut 42, that is, an axial force Fo of the bolt, which is calculated based on torque for fastening the bolt 41 into the nut 42), and on the inclination angle θ of the guide surface 14a and the engagement surface 22a. Therefore, there is no need to measure the tension of the belt after the adjustment separately from the connection work using the connectors 40, and hence the work of adjusting the tension of the belt 33 can be simplified.

Note that, under such conditions that the friction occurring at the engagement portion between the guide surface 14a and the engagement surface 22a and the friction occurring at the engagement portions between the bolt 41 and the stay 22b and between the nut 42 and the stay 14b are ignored, the tension F1 of the belt 33 after the adjustment can be calculated by using the expression of Fo×cos θ×sin θ based on the axial force Fo of the bolt, which is calculated based on the torque for fastening the bolt 41 into the nut 42 (which needs to be measured), and on the inclination angle θ of the guide surface 14a and the engagement surface 22a.

Further, in the electrical power steering system 100, each of the guide surface 14a and the engagement surface 22a is an inclined surface. Therefore, the engagement between the guide surface 14a and the engagement surface 22a can be stabilized, and the work of adjusting the tension of the belt 33 can therefore be facilitated. Still further, in this embodiment, each connector 40 includes the bolt 41 assembled onto the casing 22 and arranged in parallel to the axial line Lo of the rotational shaft 21, and the nut 42 assembled onto the housing 14 and threadedly fixed onto the bolt 41. In addition, the axial line L2 of the bolt 41 is arranged in a region in which the guide surface 14a is present in the inclination direction of the guide surface 14a. Therefore, the operation (sliding operation) between the guide surface 14a and the engagement surface 22a when fastening the bolt 41 into the nut 42 can be stabilized, and the workability thereof can therefore be enhanced.

Figure 4:
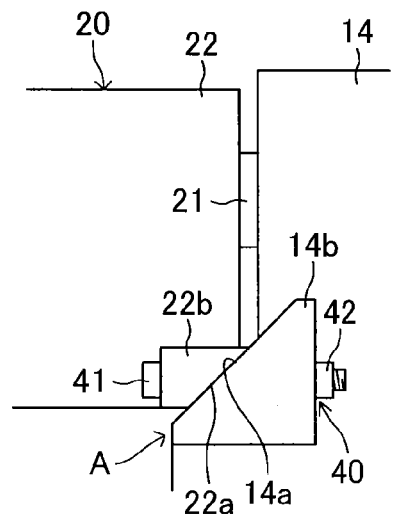
FIG. 4 is an enlarged front view schematically illustrating a main part of an electrical power steering system according to another embodiment of the present invention.

In the belt tension adjustment mechanism A of the above-mentioned embodiment, the present invention is carried out so that the guide surface 14a and the engagement surface 22a are formed separately from the connectors 40. Alternatively, as in an embodiment illustrated in FIG. 4, the present invention may be carried out so that the guide surface 14a and the engagement surface 22a are formed integrally with the connectors 40. In this embodiment, the guide surface 14a is formed in the housing-side stay 14b, and the engagement surface 22a is formed in the motor-side stay 22b. Note that, other components are substantially the same as those of the above-mentioned embodiment (embodiment illustrated in FIGS. 1 to 3), and description thereof is therefore omitted herein. Besides, the actions and effects of this embodiment are substantially the same as those of the above-mentioned embodiment, and description thereof is therefore omitted herein.

Further, in the belt tension adjustment mechanism A of the above-mentioned embodiment, the present invention is carried out so that the guide surface 14a and the engagement surface 22a are formed in a plane that allows slidable engagement therebetween. Alternatively, as in an embodiment illustrated in FIG. 5, the present invention may be carried out so that a ratchet mechanism 140 for allowing an operation in only a direction of increasing the tension of the belt (33) is provided between the guide surface 14a and the engagement surface 22a. As shown in FIG. 6, a tooth pitch α of a ratchet 141 of the ratchet mechanism 140 is set smaller than an adjustment range ΔS1, which falls within a range of a target tension of the belt in a case of an upper limit of an individual difference (fluctuation) of the belt (in a case of the belt that exhibits a highest value with respect to the tension of the belt). Note that, an adjustment range ΔS2, which falls within the range of the target tension of the belt in a case of a lower limit of the individual difference (fluctuation) of the belt, is larger than the above-mentioned adjustment range ΔS1 in the case of the upper limit, and is also larger than the tooth pitch α of the ratchet 141. Note that, other components of the embodiment illustrated in FIG. 5 are substantially the same as those of the above-mentioned embodiment (embodiment illustrated in FIGS. 1 to 3), and description thereof is therefore omitted herein.

Figure 5:
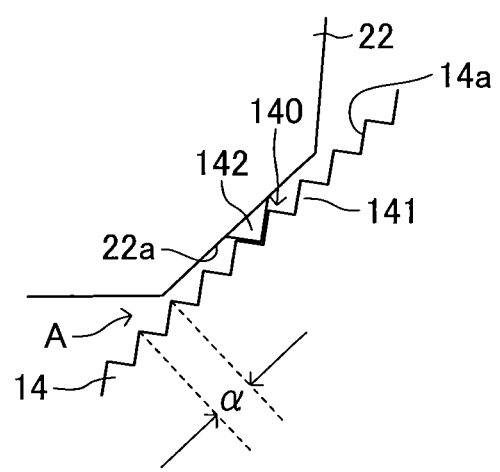
FIG. 5 is an enlarged front view schematically illustrating a main part of an electrical power steering system according to an embodiment in which a ratchet mechanism is provided between an engagement surface formed in a casing and a guide surface formed in a housing.
Figure 6:
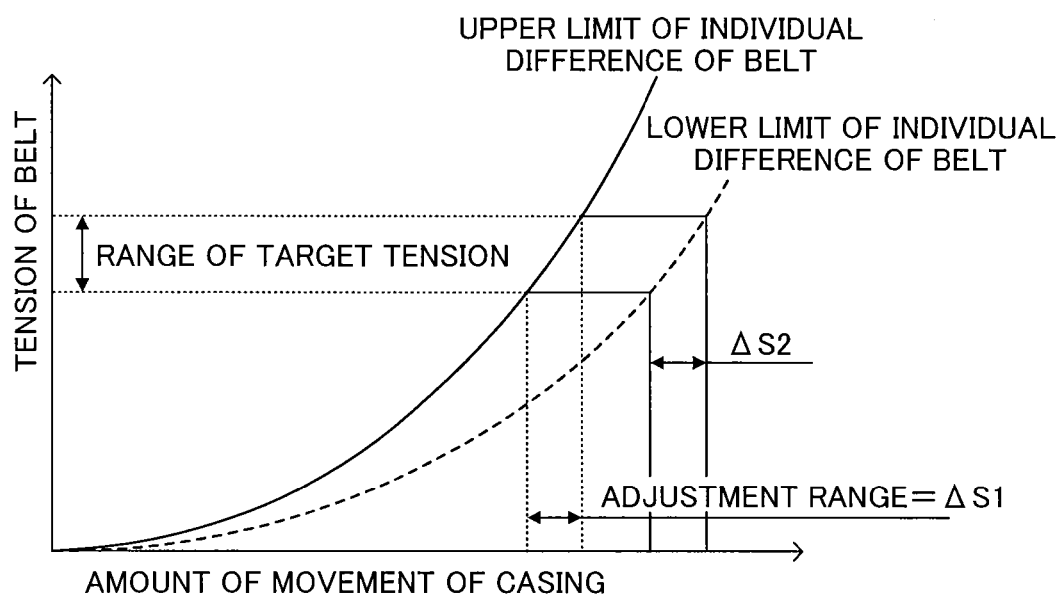
FIG. 6 is a graph showing a relationship between an amount of movement of the casing relative to the housing illustrated in FIG. 5 (amount of movement of the engagement surface relative to the guide surface) and a tension of a belt.

In the above-mentioned embodiment illustrated in FIG. 5, the ratchet mechanism 140 is provided between the guide surface 14a and the engagement surface 22a. Therefore, the casing 22 is moved relative to the housing 14 in the direction of increasing the tension of the belt (33) (in the upward direction), and thus the tension of the belt (33) can be adjusted in an increasing manner. Besides, under the state in which the tension of the belt (33) is adjusted in an increasing manner, the reverse movement (downward operation of the casing 22 relative to the housing 14 (operation in a direction of decreasing the tension of the belt)) is restricted by the ratchet mechanism 140 of the belt tension adjustment mechanism A. Note that, the state in which the tension of the belt (33) is adjusted is retained by the connectors (40), and thus the tension of the belt (33) is maintained.

Thus, in the embodiment illustrated in FIG. 5, the tension of the belt (33) can be adjusted in an increasing manner without the need to use a jig for fixing the positions of the housing 14 and the casing 22, and the workability can therefore be enhanced. Further, in this embodiment, even if the housing 14 and the casing 22 connected and fixed together through use of the connectors (40) are loosened, the ratchet mechanism 140 restricts the downward movement of the casing 22 relative to the housing 14. Accordingly, the positional misalignment of the casing 22 and the housing 14 is prevented, and thus the decrease in tension of the belt due to the positional misalignment is prevented.

Further, in the embodiment illustrated in FIG. 5, not only in the case of the lower limit of the individual difference of the belt, but also in the case of the upper limit of the individual difference of the belt, through adjustment by an amount corresponding to one tooth (α) of the ratchet 141, which is to be carried out lastly during the work of adjusting the tension of the belt, a pawl (notch) 142 of the ratchet mechanism 140 engages with the tooth of the ratchet 141 within the adjustment range (ΔS1), which falls within the range of the target tension of the belt, and as a result, the reverse movement (operation in the direction of decreasing the tension of the belt) is restricted. Thus, through the above-mentioned adjustment by an amount corresponding to one tooth (α), the amount of movement of the casing is not adjusted beyond the adjustment range (the tension of the belt is not excessively adjusted in an increasing manner), and as a result, the tension of the belt (33) can be adjusted appropriately.

In the embodiments described above, the present invention is carried out so that the guide surface 14a is formed in the housing 14 of the steering apparatus 10 and the engagement surface 22a is formed in the casing 22 of the electrical motor 20. Alternatively, the present invention may be carried out so that the engagement surface is formed in the housing of the steering apparatus and the guide surface is formed in the casing of the electrical motor.

Further, in the embodiments described above, the present invention is carried out so that the nut 42 is assembled onto the housing 14 of the steering apparatus 10 and the bolt 41 is assembled onto the casing 22 of the electrical motor 20. Alternatively, the present invention may be carried out so that the bolt is assembled onto the housing of the steering apparatus and the nut is assembled onto the casing of the electrical motor.

Still further, in the embodiments described above, the present invention is applied to the electrical power steering system 100 in which the rotational shaft 21 of the electrical motor 20 is arranged in parallel to the rack shaft 11 arranged in the vehicle width direction, but the present invention is not limited thereto. In a similar manner to the embodiments described above or through appropriate modification thereof, the present invention may also be applied to various types of electrical power steering system (for example, an electrical power steering system in which the electrical motor is arranged in parallel to the steering shaft arranged in a vehicle fore-and-aft direction).

The invention claimed is:

1. An electrical power steering system, which is configured to assist steering by transmitting, through a belt, a rotational force of a driving pulley to a driven pulley, the driving pulley being coaxially coupled to a rotational shaft of an electrical motor, the driven pulley being coaxially coupled to a rotational member of a steering apparatus, the electrical power steering system comprising a belt tension adjustment mechanism for adjusting a tension of the belt, the belt tension adjustment mechanism comprising:

a guide surface and an engagement surface, which are respective mating surfaces of a housing of the steering apparatus and a casing of the electrical motor that engage with each other; and a connector capable of relatively moving the engagement surface along the guide surface due to a connection force connecting the housing and the casing under a state in which the guide surface and the engagement surface engage with each other, the guide surface being inclined by a predetermined amount with respect to an axial line direction of the rotational shaft, the electrical power steering system further comprising a ratchet mechanism provided between the guide surface and the engagement surface to allow movement of the engagement surface relative to the guide surface in only a direction that increases the tension of the belt.

2. An electrical power steering system according to claim 1, wherein a tooth pitch of a ratchet of the ratchet mechanism is set smaller than a range of a target tension of the belt corresponding to an upper limit of belt fluctuation.

* * * * *